(12) United States Patent
Marsden (10) Patent No.: US 9,681,645 B2
(45) Date of Patent: Jun. 20, 2017

(54) STRUCTURE FOR ATTRACTING AND ACCUMULATING AQUATIC ORGANISMS

(71) Applicant: Matthew E Marsden, Signal Mountain, TN (US)

(72) Inventor: Matthew E Marsden, Signal Mountain, TN (US)

(*) Notice: Subject to any disclaimer, the term of this patent is extended or adjusted under 35 U.S.C. 154(b) by 0 days.

(21) Appl. No.: 14/513,257

(22) Filed: Oct. 14, 2014

(65) Prior Publication Data
US 2016/0100559 A1    Apr. 14, 2016

(51) Int. Cl.
| A01K 61/00 | (2006.01) |
|---|---|
| A01K 97/00 | (2006.01) |
| A01K 99/00 | (2006.01) |
| A01K 61/70 | (2017.01) |

(52) U.S. Cl.
CPC ............ *A01K 61/006* (2013.01); *A01K 61/70* (2017.01); *A01K 97/00* (2013.01); *A01K 99/00* (2013.01)

(58) Field of Classification Search
CPC ...... A01K 61/006; A01K 97/00; A01K 97/10; A01K 99/00; A01K 61/70
USPC ......................................................... 119/221
See application file for complete search history.

(56) References Cited

U.S. PATENT DOCUMENTS

| 1,815,679 A | 7/1931 | Ruth |
|---|---|---|
| 3,517,912 A | 6/1970 | Foley |
| 3,753,553 A | 8/1973 | Bockting |
| 4,130,086 A | 12/1978 | Jones |
| 4,441,453 A | 4/1984 | McMickle |
| 4,727,672 A | 3/1988 | Hill |
| 5,195,460 A | 3/1993 | Loken |
| 5,235,935 A | 8/1993 | Edwards |
| 5,533,295 A | 7/1996 | Hochberger |

(Continued)

FOREIGN PATENT DOCUMENTS

| CN | 201054926 Y | 5/2008 |
|---|---|---|
| CN | 201839702 | 5/2011 |

(Continued)

OTHER PUBLICATIONS

Moes, Ed, "Original Fish'N Tree", www.crappie.com, http://www.crappie.com/crappie/crappie-cover-lake-structure-and-pond-mgmt/109201-original-fishn-tree/, Crappie LLC, 598 Penn Blvd, Lake Villa, IL 60046 (Oct. 9, 2009).

(Continued)

*Primary Examiner* — Korie H Chan
(74) *Attorney, Agent, or Firm* — Baker Donelson (57) ABSTRACT

A structure for attracting and accumulating aquatic organisms that is a simple, inexpensive, non-degradable unit, easy to assemble and use, as well as easy to retrieve and move for use in a different location, formed of a central 4" PVC pipe having cut outs through which are inserted bar slats made of solid, generally rigid, 100% PVC material. The bar installation is a compressed fit into the cut-out sections of pipe, forming a compress fit, self-expanding, spring-lock design. Holes may be drilled in each end of the central pipe so that a hook may be inserted in one end, allowing the habitat structure to be hung from a dock or tethered to another stationary object, or retrieved with a boat hook for ease in removal and relocation. Alternatively, the use of coupling connections permits joining one habitat structure to another in order to form a larger habitat structure.

6 Claims, 8 Drawing Sheets

(56) References Cited

U.S. PATENT DOCUMENTS

| | | | |
|---|---|---|---|
| 5,572,949 | A | 11/1996 | Bryant, Jr. |
| 6,523,497 | B2 * | 2/2003 | Smith .................. A01K 61/006 |
| | | | 119/221 |
| 6,824,327 | B1 * | 11/2004 | Walter .................. A01K 61/006 |
| | | | 119/221 |
| 6,978,735 | B1 | 12/2005 | Yeager |
| 7,568,306 | B1 * | 8/2009 | Rice, Sr. ................ A01K 97/10 |
| | | | 248/530 |
| D607,081 | S | 12/2009 | Harper |
| D607,082 | S | 12/2009 | Harper |
| 7,735,454 | B1 * | 6/2010 | Stoppelberg ......... A01K 5/0225 |
| | | | 119/52.4 |
| D625,471 | S * | 10/2010 | King ........................... D30/106 |
| 7,828,493 | B1 * | 11/2010 | Brignac ............... A01K 61/006 |
| | | | 119/221 |
| 8,635,973 | B1 | 1/2014 | Shepard |
| 8,640,651 | B2 | 2/2014 | Ewald |
| D717,501 | S | 11/2014 | King |
| D757,369 | S | 5/2016 | Marsden |
| 2002/0190016 | A1 * | 12/2002 | Ta ......................... A47F 5/0006 |
| | | | 211/116 |
| 2003/0000480 | A1 | 1/2003 | Jenkins |
| 2003/0033985 | A1 * | 2/2003 | Hardison ........... A01K 39/0113 |
| | | | 119/57.9 |
| 2004/0168649 | A1 | 9/2004 | Harper |
| 2009/0283051 | A1 | 11/2009 | Metzler |
| 2012/0279109 | A1 | 11/2012 | Nichol |
| 2014/0158061 | A1 | 6/2014 | Beasley |

FOREIGN PATENT DOCUMENTS

| | | |
|---|---|---|
| CN | 102792904 A | 11/2012 |
| CN | 202750576 U | 2/2013 |
| EM | 000030226-002 | 5/2003 |
| EM | 000030226-003 | 5/2003 |
| FR | 2376623 | 8/1978 |
| JP | 2008161096 | 7/2008 |
| KR | 300403387 | 6/2006 |
| KR | 20080005137 | 11/2008 |
| KR | 20110101757 | 9/2011 |
| KR | 101167489 | 7/2012 |
| NZ | 22690 | 7/1989 |
| WO | 0049859 | 8/2000 |
| WO | DM2006068102 | 8/2006 |

OTHER PUBLICATIONS

Frazee, Brent, "Fish'N Tree latest advance in fishing-tackle market", The Sumter Daily Item, Sumter, SC, https://news.google.com/newspapers?nid=1979&dat=198702038,id=0oQiAAAAIBAJ&sjid=6akFAAAAIBAJ&pg=4057,5216009&hl=en, (Feb. 5, 1997).

Wagner, Eric, "Review of Fish Habitat Improvement Methods for Freshwater Reservoirs", Fisheries Experiment Station, Logan, UT 84321 (2012).

Jones, Amberle; Weedman, Dave; Gill, Curt; Dickens, Bryant; "A Catalog of Reservoir Fish Habitat Structures 2015 (Version 2.0)", Arizona Game and Fish Department, Habitat Branch, 5000 W. Carefree Highway, Phoenix, AZ 85086 (2015).

www.crappie.com/crappie/crappie-cover-lake-structure-and-pond-mgmt/60757-need-photos-attractors-brushpiles/#post468941, (post#9); Crappie, LLC; 598 Penn Blvd, Lake Villa, IL 60046 (Mar. 25, 2008).

www.crappie.com/crappie/crappie-cover-lake-structure-and-pond-mgmt/216157-addition-performance-testing-natural-brush-pile-bamboo-pvc-condos, (post #5), Crappie, LLC; 598 Penn Blvd, Lake Villa, IL 60046 (May 22, 2012).

www.crappie.com/crappie/crappie-cover-lake-structure-and-pond-mgmt/207580-anybody-build-pvc-trees-2.html, (post #18); Crappie, LLC; 598 Penn Blvd, Lake Villa, IL 60046 (Jul. 28, 2012).

www.crappie.com/crappie/crappie-cover-lake-structure-and-pond-mgmt/216157-addition-performance-testing-natural-brush-pile-bamboo-pvc-condos, (post #5 and post #10), Crappie, LLC; 598 Penn Blvd, Lake Villa, IL 60046 (May 22, 2012).

Marsden, Matthew E., U.S. Appl. No. 15/399,559, continuation-in-part, Handle For Structure For Attracting And Accumulating Aquatic Organisms, Jan. 5, 2017.

* cited by examiner

STRUCTURE FOR ATTRACTING AND ACCUMULATING AQUATIC ORGANISMS

FIELD OF THE INVENTION

The invention relates generally to artificial structures for attracting fish. More specifically, the invention relates to a roughly helix-shaped fish aggregation apparatus.

DESCRIPTION OF THE RELATED ART

In aquatic environments underwater structures such as rocks, reefs, logs, stumps, brush piles, and vegetation are all natural fish attractors that create a habitat for fish and aquatic organisms to thrive. Unfortunately, as ponds, lakes, and reservoirs age, the habitat is lost through the normal process of decay and sedimentation, and the result is a corresponding reduction in fish species, fishing spots, and fishing-related commerce.

Prior art approaches to creating fish habitats in many instances have been simply felled, discarded pine or cedar trees, especially retired Christmas trees. Sport fishermen often deposit these trees in convenient fishing locations, such as near docks, to provide a habitat for the fish that they wish to pursue. The fish eventually gather near the protective habitat, and the fishing location is enhanced.

Regrettably, many prior art fish habitats made of woody materials routinely snag fish hooks and thereby severely limit the beneficial aspects of the fish habitat and convenient fishing location. Specifically, pine, cedar, and fir trees include a plurality of small branches which are easily snagged by conventional fish hooks. In addition to snagging problems associated with these natural fish attractors, their woody composition degrades and decomposes with time, as well. Accordingly, there exists a need for a means by which fish habitats can be replaced or created in a manner that is quick, easy, effective, and long-lasting. The helical aggregation apparatus of the present invention fulfills this need.

Other types of artificial fish beds or reef systems are disclosed in the patent literature, including U.S. Pat. No. 5,201,136 issued in the name of La Morte et al.; U.S. Pat. No. 4,993,362 issued in the name of Jimbo; and U.S. Pat. No. 4,947,791 issued in the name of Laier et al.

Fish aggregating systems in an anchored or floating mode are described in U.S. Pat. No. 4,916,845 issued in the name of Aydelette, Sr. et al.; U.S. Pat. No. 4,727,672 issued in the name of Hill et al.; and U.S. Pat. No. 4,471,552 issued in the name of McIntosh et al. A submersible object with a bait compartment for attracting fish is described in U.S. Pat. No. 5,555,670, issued in the name of Troutman et al. A fish attracting basin stump is described in U.S. Pat. No. 5,272,829 issued in the name of Roberts et al.

SUMMARY OF THE INVENTION

The habitat of the present invention is a simpler, inexpensive, non-degradable unit that is easy to assemble and use, as well as easy to retrieve and move for use in a different location. It is formed of a central 4" PVC pipe having cut outs through which are inserted bar slats made of solid, generally rigid, 100% PVC material. The bar installation is a compressed fit into the cut-out sections of pipe, forming a self-expanding, spring-lock, tension fit design. The PVC bars are compressed using hand pressure and positioned through the pipe. Tension fit design allows bars to be installed and secured without the use of mechanical fasteners, solvent welds, or adhesive materials. When the bar is in position, it is released; and the spring-loaded sides of the bar then wedge tight into the walls of the pipe, securing the bar in place. Holes may be drilled in each end of the central pipe so that a hook may be inserted in one end, allowing the habitat to be hung from a dock or tethered to another stationary object, or retrieved with a boat hook for ease in removal and relocation.

Alternatively, the use of coupling connections permits joining one habitat structure to another in order to form a larger habitat structure. Any method of joinder may be used, but one alternative is a standard plumbing coupling, and the other type is a "bell and spigot." The coupling devices are inserted into, or may be fitted onto, the tubular ends of the habitat structure such that opposing ends may be mated to join two habitat structures together.

Therefore, it is an object of the present invention to provide a fish habitat that provides an artificial habitat for fish, thereby promoting the proliferation of fish species and the enjoyment of sport fishing.

It is another object of the present invention to provide a fish habitat that encourages the growth of other aquatic life and provides protection from predators.

It is still another object of the present invention to provide a fish habitat that allows fish to feed.

It is another object of the present invention to provide an artificial fish habitat with a base made of large diameter PVC pipe.

It is another object of the present invention to provide an artificial fish habitat with bar slats that pass through the base and that are disposed at 60 degrees or other angles to adjacent slats, thereby forming a helical shaped structure for fish to weave in and out through.

It is another object of the present invention to provide an artificial fish habitat that rests on a pond, lake or reservoir bottom.

It is still another object of the present invention to provide a fish habitat that can be moved or removed from a body of water.

It is another object of the present invention to provide an artificial fish habitat that can be used to replace natural habitats that have been destroyed.

Briefly described according to one embodiment of the present invention, a helical fish aggregation apparatus is disclosed for providing an artificial habitat for fish seeking refuge from predators or seeking other fish or food to eat.

The present invention is comprised of PVC piping and bar slats arranged in a helical pattern spaced approximately 60 degrees apart and forming a structure approximately five feet long by six feet wide, although larger or smaller dimensions may be used. The artificial habitat invention is lowered to the bottom of a body of water, or may be suspended above the bottom, and provides cover for any fish seeking food or refuge from predators. The invention can enhance the desirability of convenient fishing spots by providing an area where fish tend to congregate. The use of the present invention provides fish an artificial habitat in areas where natural ones do not exist.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENT

Detailed Description of the Figures

Figure 1:
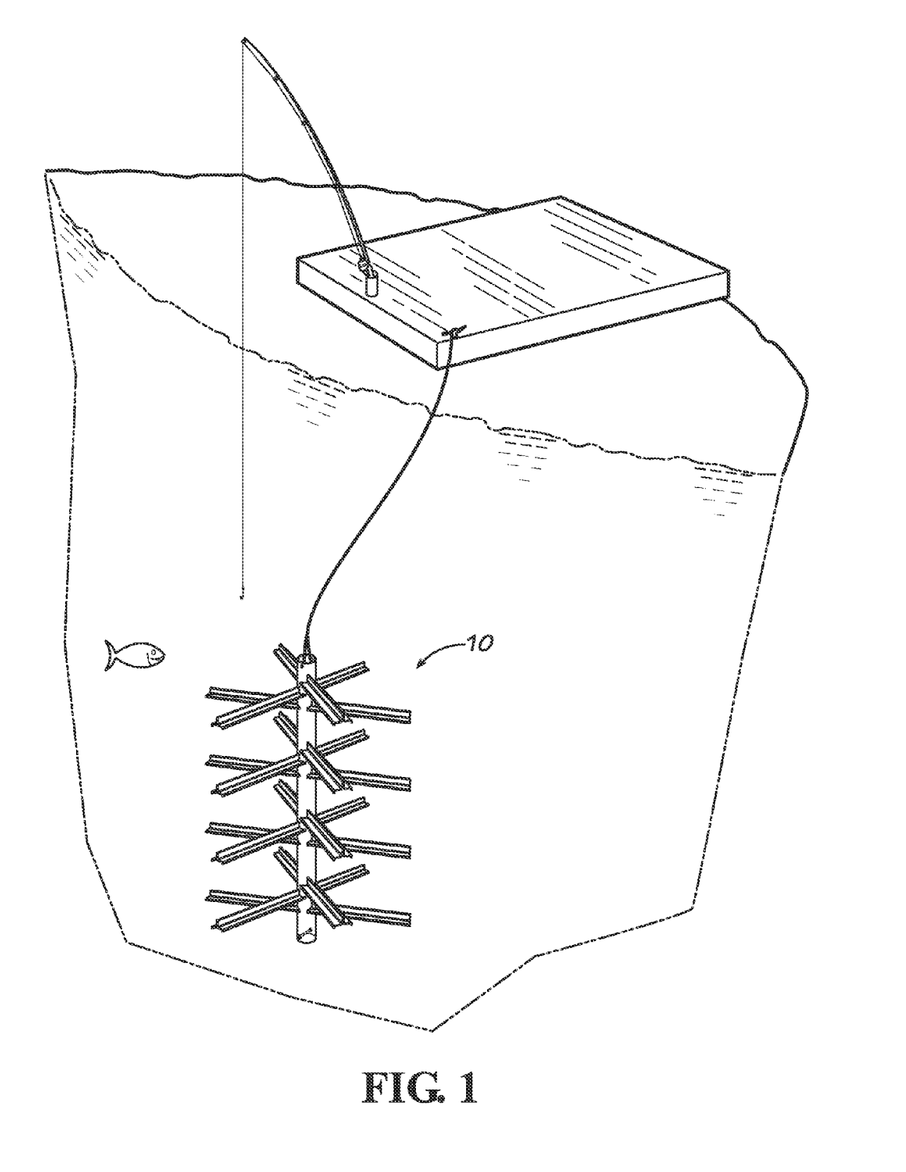
FIG. 1 is a perspective view of an artificial fish habitat constructed in accordance with the principles of a first preferred embodiment of the present invention, and shown in use submerged vertically in a body of water with a fish hook descended through the openings between slats.
Figure 2:
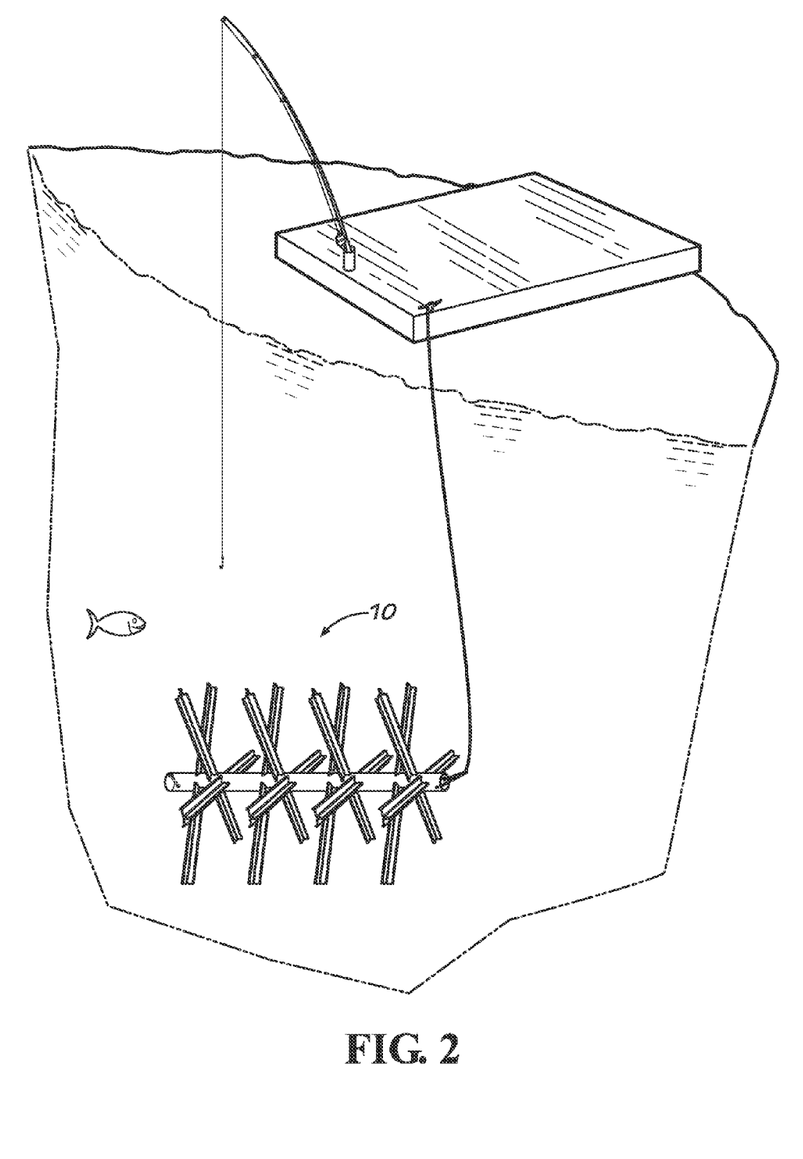
FIG. 2 is a perspective view of an artificial fish habitat constructed in accordance with the principles of a first preferred embodiment of the present invention, and shown in use submerged horizontally in a body of water.
Figure 3:
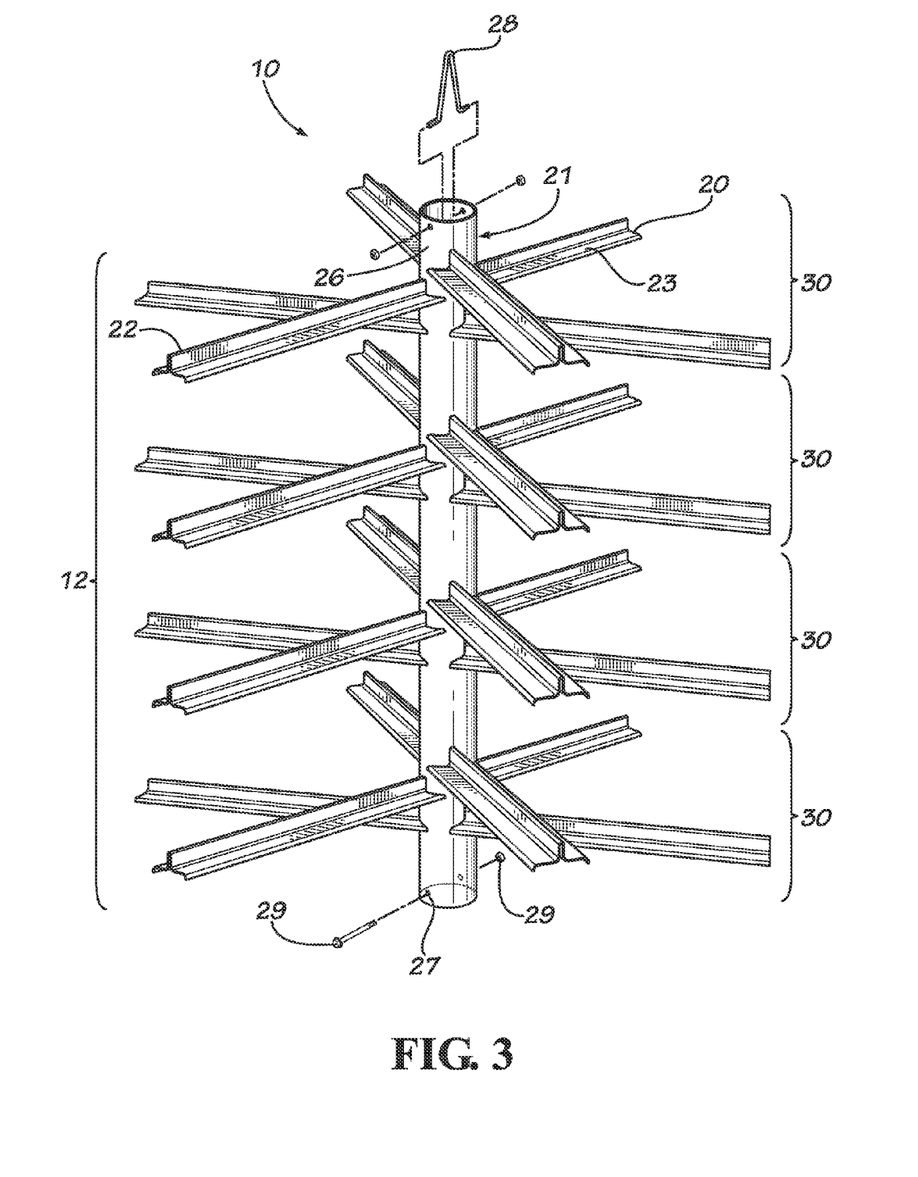
FIG. 3 is a perspective view of a helical fish aggregation apparatus according to the preferred embodiment of the present invention.
Figure 4:
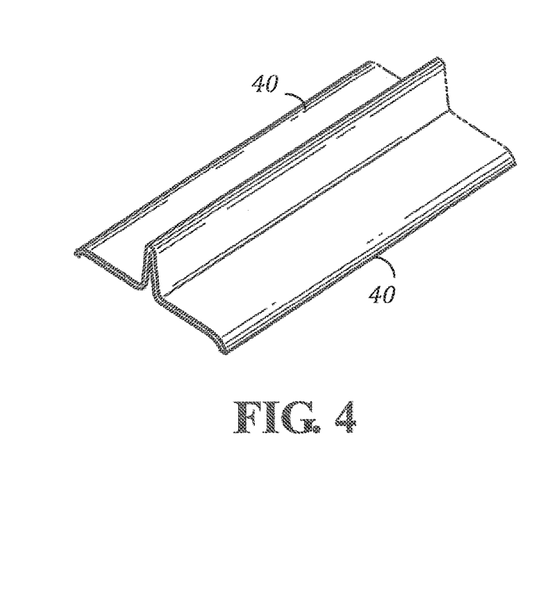
FIG. 4 is a perspective view of a slat of the present invention, showing slats.

FIG. 1 illustrates a fish habitat 10 constructed in accordance with the principles of a preferred embodiment of the present invention. The habitat 10 is configured for placement within a body of water to provide an environment for fish or other aquatic life. The habitat 10 additionally facilitates fishing for fish and other aquatic life and may be utilized in any body of water, including ponds, lakes, streams, rivers, oceans, etc. Additionally, while the habitat 10 is illustrated in proximity to a dock and a shore, the habitat 10 may be utilized in any portion of the body of water, including shallow and deep portions, and in fully submerged and partially submerged configurations.

Turning now to FIGS. 1-5, a first preferred embodiment of the present invention is illustrated generally comprising a habitat 10 including an open framework 12. The framework 12 is open such that water, fish, and other aquatic life may easily pass into, through, and around the framework 12. The framework 12 preferably presents a substantially helical shape, as illustrated in FIGS. 1-10. However, the framework 12 may present any appearance and have a non-uniform shape. As described in more detail below, the framework 12 is preferably non-buoyant such that the framework 12 is operable to sit on the bottom of the body of water or dangle in location from a pier or other object. In addition, preferably the framework 12 is water-resistant such that the habitat 10 and framework 12 are not damaged by use and submersion in the body of water.

Referring now to FIGS. 3-9, a helical fish aggregation apparatus 10 is shown, according to the present invention, comprised of a plurality of linearly elongated bar slat members 20, and a cylindrical, elongated supporting member 21 forming a generally 4 feet long by 5 feet wide structure for providing an artificial habitat for fish seeking refuge from predators or seeking other fish or food to eat. The support member 21 defines a plurality of spaced-apart through slots or cut outs 23 and a plurality of elongated slats 20 that extend though the cut outs to define branch arms of the apparatus. Each cut out 25 defines a first channel having a longitudinal axis in a first direction and an arcuate end and a second channel having a longitudinal axis in a second direction different from the first direction and having opposing arcuate ends. The framework 12 is formed by the slat members 20 and supporting member 21 within the framework 12 such that the framework 12 is open, and provides the framework 12 with its substantially uniform helical shape. In the preferred embodiment, sixteen slat members 20 are constructed of PVC material, wherein each slat member 20 is of a linearly elongated configuration formed with an integral central ridge 22 and integral side flanges 23 disposed in the opposition direction from that of the central ridge 22. Slat members 20 may be of uniform or multiple lengths.

Figure 5:
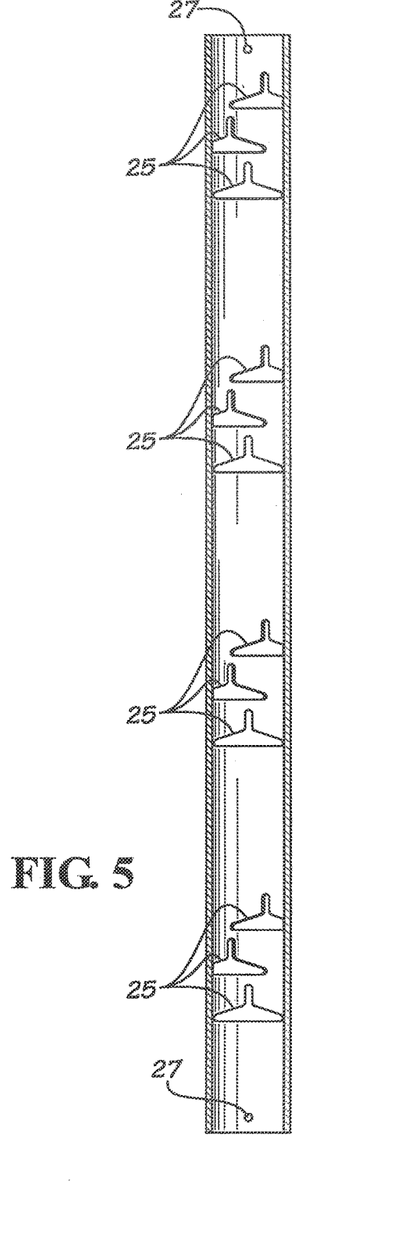
FIG. 5 is a perspective view of the supporting member of the present invention, showing slat member cutouts and supporting member holes.
Figure 6:
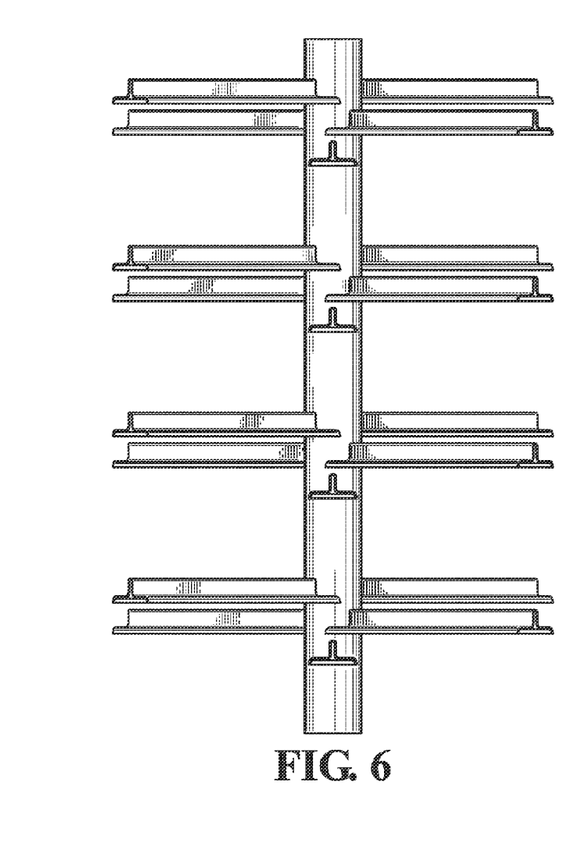
FIG. 6 is a front elevation view thereof.
Figure 7:
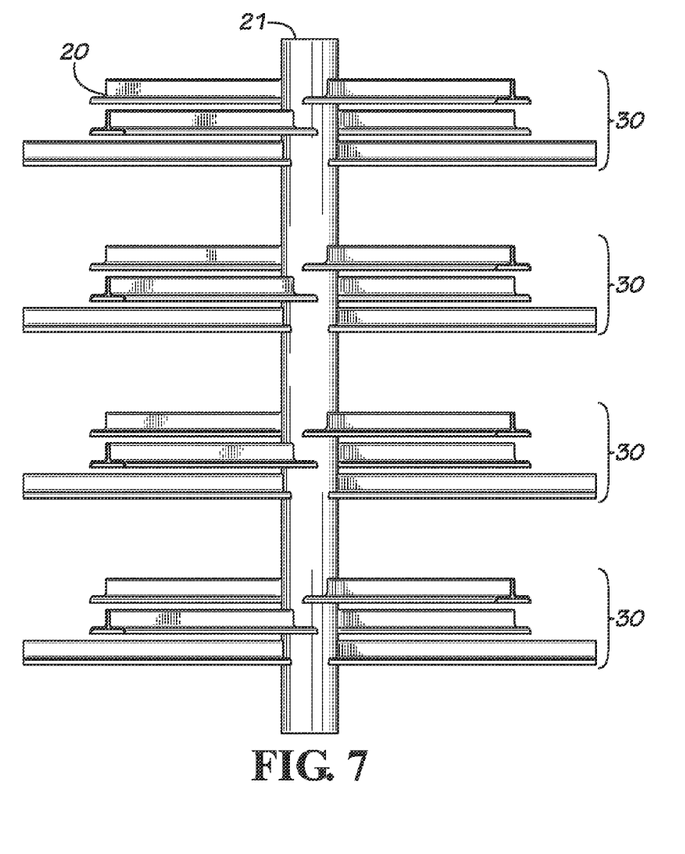
FIG. 7 is an elevation view rotated 45 degrees from the view depicted in FIG. 4.
Figure 8:
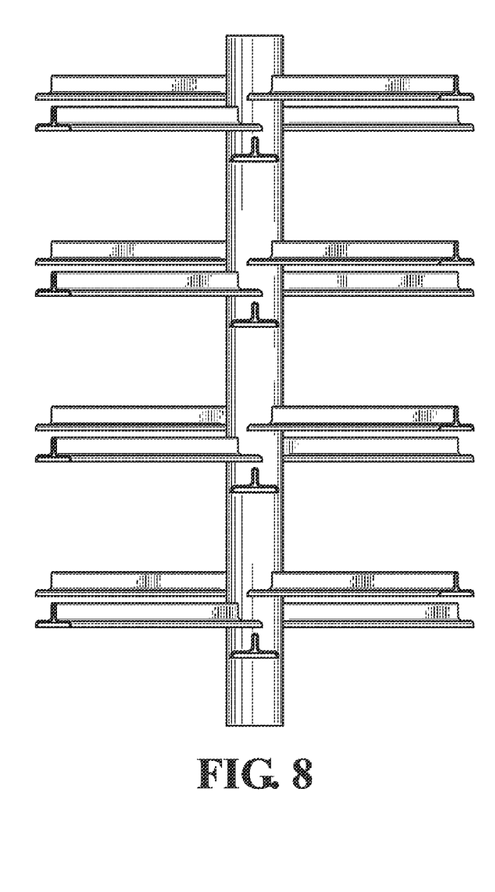
FIG. 8 is an elevation view rotated 45 degrees from the view depicted in FIG. 5.
Figure 9:
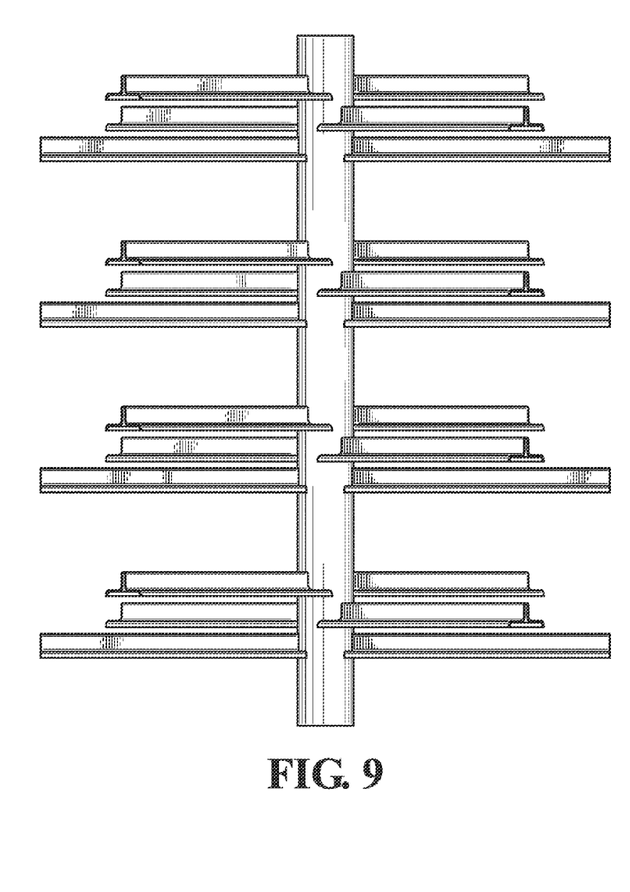
FIG. 9 is a back elevation view rotated 45 degrees from the view depicted in FIG. 6.
Figure 10:
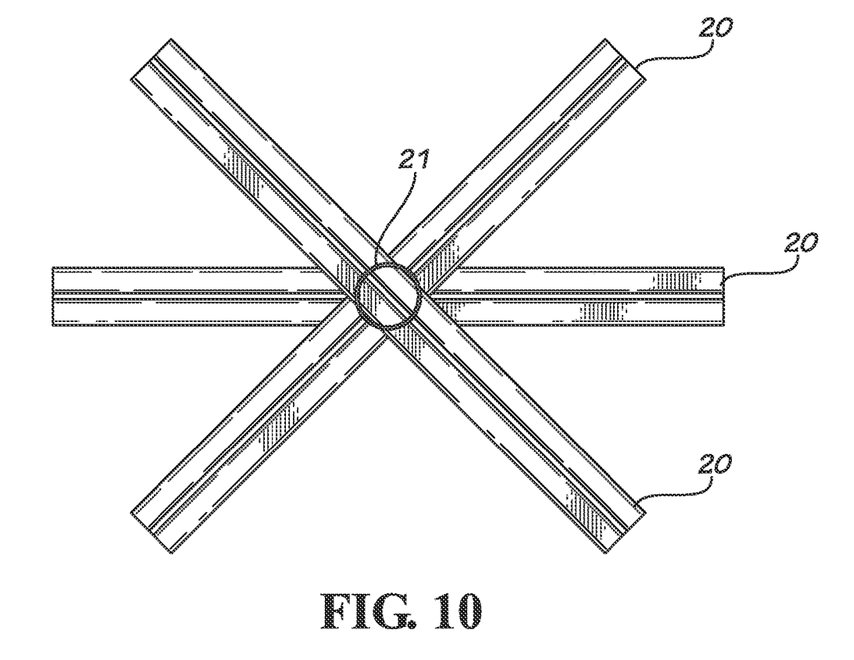
FIG. 10 is a top plan view of a helical fish aggregation apparatus according to the preferred embodiment of the present invention.
Figure 11:
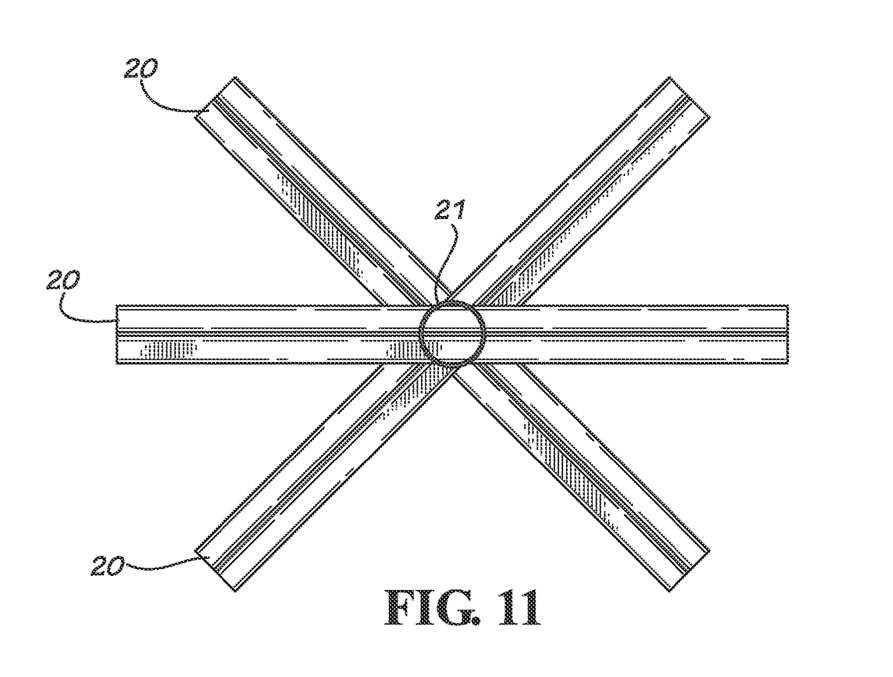
FIG. 11 is a bottom plan view thereof.
Figure 12:
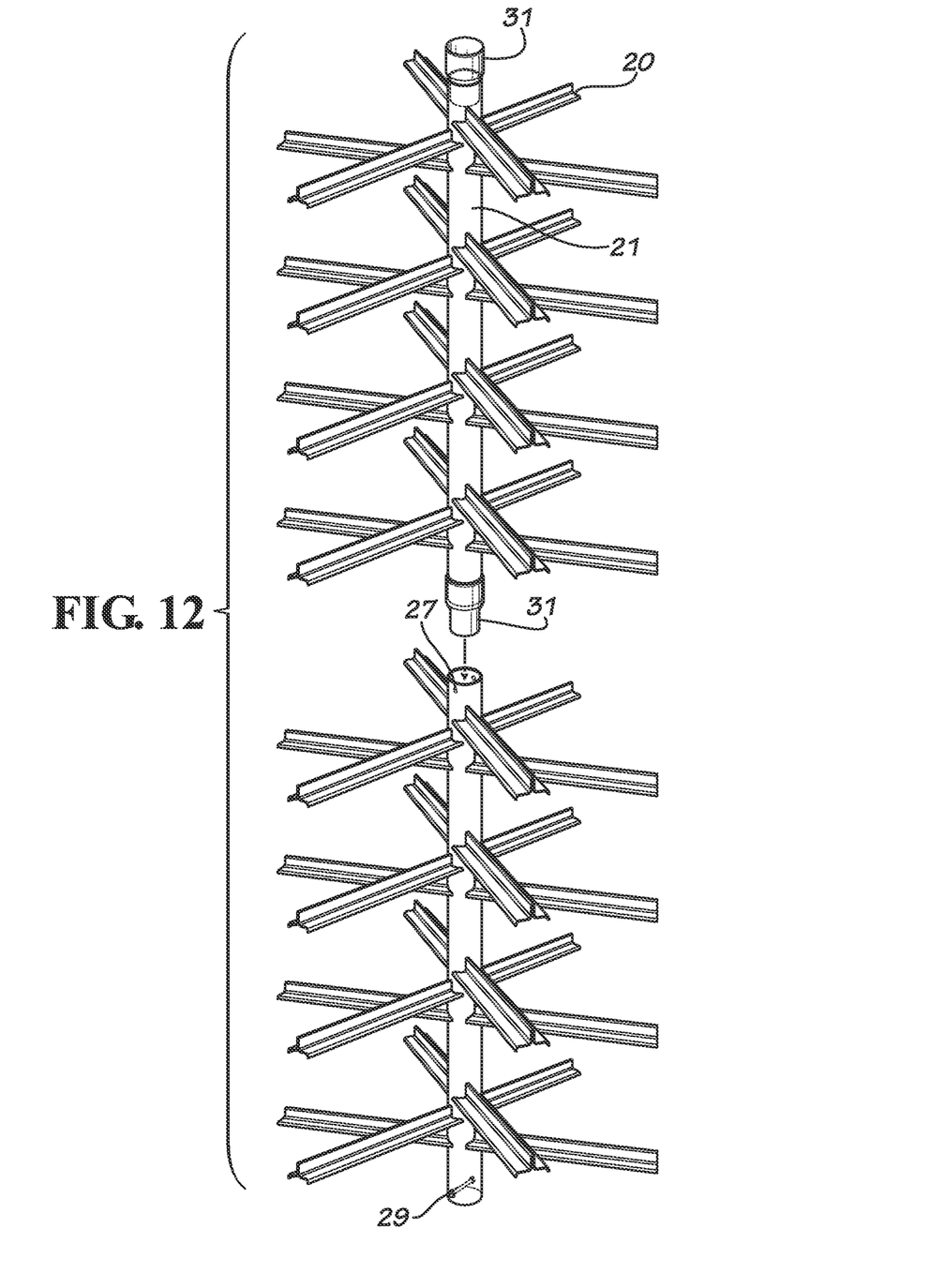
FIG. 12 is a perspective view of two helical fish aggregation apparatuses joined together according to the preferred embodiment of the present invention.

As shown in FIG. 5, elongated supporting member 21 preferably is formed of a central 4" PVC pipe having cut outs 25 through which are inserted bar slats 20 preferably made of solid, generally rigid, 100% PVC material. A plurality of paired opposing cut outs 25 are drilled in an upper external circumferential surface of the elongated supporting member 21, aligned in a helical series such that each pair of opposing cut outs 25 is preferably separated by a distance of approximately 4 inches along the length of supporting member 21. Each pair of opposing cut outs 25 is designed so as to receive in a semi-interference type fit a linearly elongated slat 20, removably held therein by physical friction. It is envisioned that four slats 20 have a length measuring approximately 4 feet, and eight slats 20 have a length measuring approximately 5 feet. Each slat has opposing flanged edges 23 that extend laterally from a ridge 22 to a respective distal edge 40 curved in a direction opposing the ridge 22. The ridge 22 has a distal peak that seats in the arcuate end of the first channel. The respective distal edges of the flanged edges 23 seat in the opposing arcuate ends of the second channel. All slats 20 have a height of approximately 1.5 inches from bottom of flanged edges 23 to top of ridge 22. Once inserted into the supporting member cut outs 25, the slats 20 extend vertically from the supporting member 21 in a secured fashion thereby forming a helical series of vertically extending slats 20. Elongated supporting member 21 also has holes 27 for use with either a bolt and washer 29 or catch 28.

The slat installation is through the cut-out sections of pipe, forming a compress fit, self-expanding, spring-lock design. The slat being resilient for flexing the flanged edges between a first position and a second position relative to the ridge with the flanged edges in the second position, flex to the second position during installation of the slat in the slot and return to the first position upon installation, to wedge the slat in the slot. The PVC slats 20 are compressed using hand pressure and positioned through the supporting member 21. When the slat 20 is in position, it is released; and the spring-loaded sides of the slat 20 then wedge tight into the walls 26 of the supporting member 21, securing the slat 20 in place.

Holes 27 may be drilled in each end of the supporting member 21 so that a catch 28 may be inserted in one end, allowing the habitat to be hung from a dock or tethered to another stationary object, or retrieved with a boat hook for ease in removal and relocation. Similarly, a bolt 29 may be inserted in holes 27 in the other end of supporting member 21, forming a surface for attaching a rope, chain, or other material which may be used to tether the other end of the habitat 10. No ballast is required, however, as the assembled habitat 10 weighs approximately 17 lbs and will sink on its own because PVC is denser (heavier) than water.

The material is durable such that it may remain submerged in water under potentially extreme conditions without damage, and resists being easily or inadvertently punctured or damaged by a sharp items, such as fish hooks, or by other items. Additionally, the material does not leach harmful matter or otherwise have a negative effect on the body of water, as the durable and water-resistant material does not deteriorate when submerged for extended periods of time. The material utilized in fabricating the present invention is intended merely as a suggestion, and other materials may be employed.

Preferably, the habitat 10 includes at least four sets 30 of three slats 20, as illustrated in FIGS. 1-3 and 6-9, however any number of sets 30 may be utilized, including a single set 30 or even a single slat 20, depending on the desired habitat construction and the needs of the particular body of water. For instance, in a deep body of water, such as a lake or ocean, a larger number of sets 30 may be desired, while in a shallow body of water, such as a stream or pond, a smaller number of sets may be desired. In addition, as described below, habitat 10 may be joined to another habitat 10 to provide an extended framework 12 that provides a large protected area for fish.

In operation, the habitat 10 is transported to a desired fishing location such as a location in proximity to a dock, as illustrated in FIG. 1. The habitat 10 may be pre-assembled, or the habitat 10 may be assembled onsite by coupling the slats 20 and supporting member 21 into a desired configuration.

Once in position, fishing may commence. However, it will be appreciated that fish will generally take some time to begin to reside within the habitat 10. For instance, it may take a few days, or even a few weeks, based on various environmental concerns, for fish to adjust to the change in their environment and for a significant amount of fish to reside within the habitat 10. Additionally, the habitat 10 will eventually become covered with algae and other aquatic life, which provides the habitat 10 with a natural appearance that may be more appealing to fish.

If the habitat 10 is to be removed from the body of water, the habitat may be retrieved by grappling the catch 28 and pulling the habitat 10 out of the water. Similarly, once positioned, the habitat 10 may be moved to another position by grappling the catch 28 and lifting, pulling, or dragging the habitat 10 to the desired position. If the habitat 10 has been suspended from a dock or other location into the water, habitat 10 may be moved simply by retracting the suspending rope, wire, or other device.

Referring now more specifically to FIG. 5, a plurality of paired, opposing slat receiving holes 25 are formed at regular 60 degree intervals along the external circumferential surface of supporting member 21. The paired, opposing slat receiving holes 25 are 180 degrees apart from each other on the external circumferential surface of supporting member 21. Sets of three paired opposing slat receiving holes 25 are spaced preferably approximately 2.5 inches apart by length along the external circumferential surface of supporting member 21. Each slat receiving hole 25 is designed so as to receive in a semi-interference type fit a linearly elongated slat 20, removably held therein by physical friction.

It should be noted that attention to state and federal Wildlife rules and regulations prohibiting the use of such an apparatus as the present invention in particular bodies of water should be carefully observed and adhered to.

Operation of the Preferred Embodiment

The foregoing description is included to illustrate the operation of the preferred embodiment and is not meant to limit the scope of the invention. As one can envision, an individual skilled in the relevant art, in conjunction with the present teachings, would be capable of incorporating many minor modifications that are anticipated within this disclosure. Therefore, the scope of the invention is to be broadly limited only by the following claims.

I claim:
1. A helical fish aggregation apparatus comprising:
a linearly elongated, cylindrical supporting member having a plurality of pairs of opposing slat-receiving cut-outs in a wall of the supporting member, each of the cut-outs defining at least one channel;
a plurality of linearly elongated slats extending perpendicularly to the cylindrical supporting member,
wherein the slats comprise a central ridge in a first direction, with laterally extending flanges substantially normal to the central ridge and distal edges curved opposing the central ridge, whereby the curved distal edges bear loadingly against a wall of a respective cut-out to bias the central ridge in the channel of the cut-out,
wherein the slats are positioned at an oblique angle relative to each other; and
said supporting member, when engaged with said slats, forms a generally helix-like structure for providing an artificial habitat for fish.
2. The helical fish aggregation apparatus of claim 1, wherein said supporting member includes integral holes at one end for inserting a bolt and washer to act as a surface for tying onto the helical fish aggregation apparatus.
3. The helical fish aggregation apparatus of claim 1, wherein said supporting member includes integral holes at one end and a generally v-shaped catch for inserting into said holes such that said catch may be used to suspend or to retrieve the helical fish aggregation apparatus.
4. A helical fish aggregation apparatus comprising:
a linearly elongated, cylindrical supporting member;
a plurality of linearly elongated slats extending perpendicularly from the supporting member; and
a plurality of opposing pairs of slat-receiving cut-outs formed in spaced-apart relation along an external circumferential surface of the supporting member, each opposing pair of slat-receiving cut-outs defining at least one channel and receiving in a semi-interference type fit a linearly elongated slat, removably held therein by physical friction; and
wherein the slats comprise a central ridge in a first direction, with laterally extending flanges substantially normal to the central ridge and distal edges curved opposing the central ridge, whereby the curved distal edges bear loadingly against a wall of a respective one of the cut-outs to bias the central ridge in the channel of the cut-out.
5. A helical fish aggregation apparatus as recited in claim 1, wherein the pairs of cut-outs are defined at 60 degrees relative to each other.

6. A helical fish aggregation apparatus as recited in claim 1, wherein the pairs of cut-outs are disposed in groups of three pairs spaced longitudinally 2.5 inches apart.

\* \* \* \* \*